March 26, 1940.   C. A. HALL   2,195,212
SECONDARY OR STORAGE BATTERY
Filed March 18, 1938
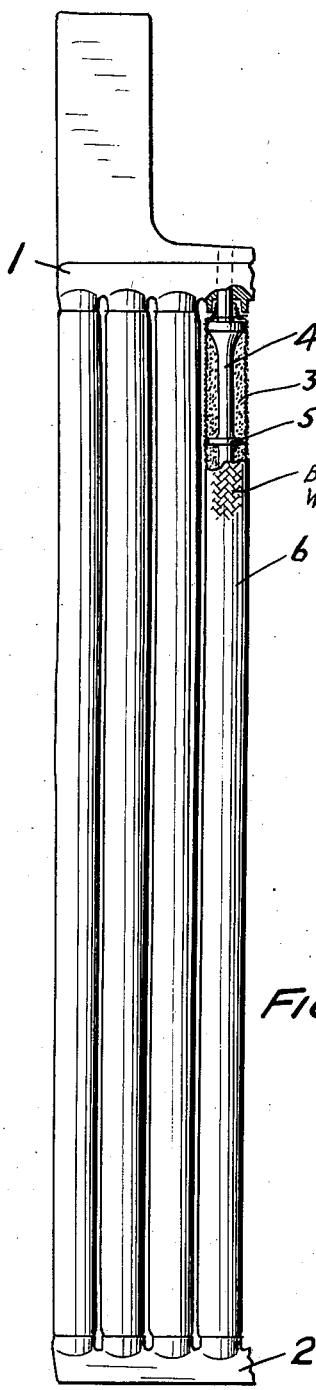
FIG.1.
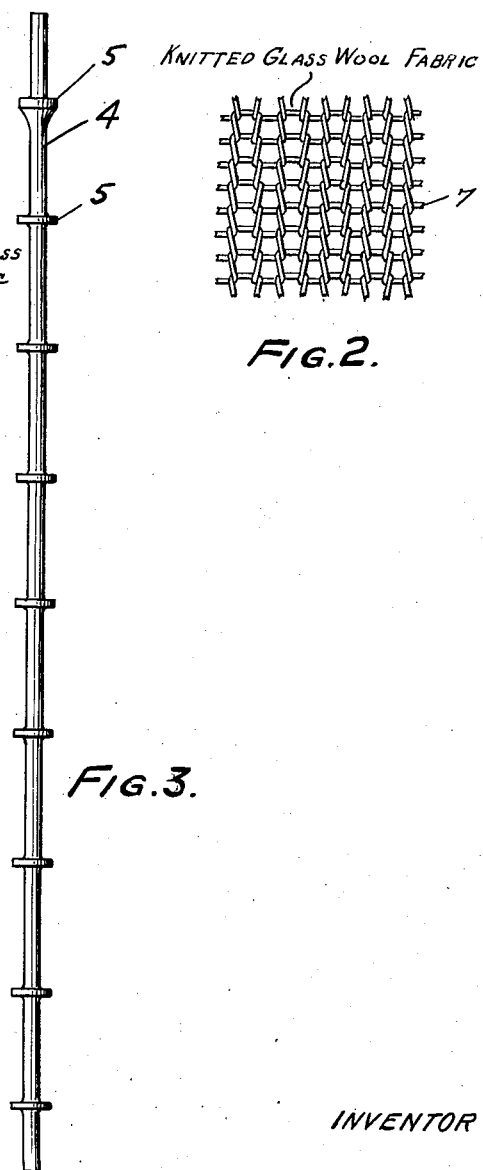
FIG.2.
FIG.3.
WITNESS:
INVENTOR
Clarence A. Hall
BY
Augustus B. Stoughton
ATTORNEY.

Patented Mar. 26, 1940

2,195,212

UNITED STATES PATENT OFFICE 2,195,212

SECONDARY OR STORAGE BATTERY

Clarence A. Hall, Philadelphia, Pa., assignor to The Electric Storage Battery Company, Philadelphia, Pa., a corporation of New Jersey Application March 18, 1938, Serial No. 196,595

5 Claims. (Cl. 136—55)

The present invention relates to improvements in secondary or storage batteries including tubular retainers containing pencils of active material or material to become active in which are embedded spines or rods connected at their ends with top and bottom bars. In use these spines or rods grow or become enlarged in diameter throughout their lengths and this growth is practically irresistible. The pencils of active material tend to soften and shed particles.

The most generally employed material from which to make the tubular retainers is slotted hard rubber. However, hard rubber under the pressure of the growth of the spines occasionally ruptures with the result that electrical contact between the pencils and the spines is interrupted and with the further result that the softened active material sheds a deposit which tends to short circuit the plates.

Asbestos has been suggested as a material from which to make the tubular retainers but, so far as I know, it has never gone into use, no doubt because even when in the form of fabric, and therefore necessarily in association with cotton, it loses its strength and coherence in a battery, and certain of its components, those containing for example iron, are soluble in the electrolyte.

Batteries with slotted rubber tubular retainers are subject to shortening of their life by rupture of the retainers as has been referred to, but the slotted rubber tubes are also subject to the defect that the area of their slots is in the first instance necessarily large in respect to the particle size of peroxide, and the size of the slots is enlarged by solution of the rubber and by other changes in it which occur under battery action. This tends to shorten the life of a battery. Again the walls of hard rubber slotted tubes are necessarily quite thick and therefore they take up room otherwise available for active material and in that way the capacity of the battery is limited. Nevertheless such batteries are useful and largely used in the art because slotted rubber separators in spite of their deleterious effect on the battery possess very many desirable features.

It is the object of the present invention to provide retaining tubes which, by curing the defects above referred to, and while retaining the advantages above indicated, will provide a battery of the type set forth possessed of all of the advantages of that type and devoid of the defects which have been above referred to.

Glass wool fabric is characterized by mobility of its fibers and threads and by non-stretchability of its fibers as well as by the small size of its pores and its thinness in respect to strength and these qualities along with other well known qualities possessed by the fabric cause it, when used in the form of tubes enclosing the pencils, to greatly prolong the useful life and efficiency of the battery, and this such tubes do, because they accommodate the growth of a spine by the relative mobility of the fibers and threads in respect to each other without permitting interruption of electrical contact between the spines and pencils and without rupture or bursting, while at the same time opposing shedding of active material as it softens. Thereafter further growth of a spine and softening of the active material is not usually so violent and is resisted by the permanent non-stretchability of the threads and fibers in a longitudinal direction and by their resilience under flexure. The described mobility of the glass wool threads and fibers of the tubes also enables a tube to be enlarged by pushing the ends together and applied over a pencil previously mounted on a spine and then restored to proper fit with the pencil by pulling the ends of the tubular retainer away from each other. Such tubes accommodate a relatively large volume of active material in a comparatively small battery space, and therefore increase the capacity, and by retaining active material in its proper place, prolong the life of the battery.

In the accompanying drawing I have illustrated a plate or electrode embodying features of the invention and in the drawing:

Figure 1 is a side view of a part of a plate or electrode embodying features of the invention and showing the glass wool fabric as of the braided variety.

Figure 2 is a view indicating the glass wool fabric as of the knitted variety; and Figure 3 is a view of one of the spines.

Referring to the drawing the top and bottom bars are indicated at 1 and 2. The pencils of active material are indicated at 3 and the spines which connect the top and bottom bars are indicated at 4. The spine 4 is shown as provided with integral spaced collars 5 and these when present tend to subdivide the pencils into sections which localize their defects if any, and the collars are also useful in molding the pencils onto the spines before the application of the tubular retainers. 6 indicates the tubular retainer which, of course, must be pervious for the passage of the ions. The necessary porosity is provided in a fabric of glass wool threads, but compared with slotted rubber the pores are very much smaller than can be made in slotted rubber and thus the fabric opposes the passage through it of very fine particles which may be shed from the pencils. The mobility of the glass fibers and threads assists in the provision of very minute openings between them in the finished fabric. Braided tubes of the character described and which are indicated at 6 in Figure 1, or knitted fabrics of the character as indicated at 7, to a greatly enlarged scale, are advantageous because in them advantage is taken of the relative mobility of the fibers and threads to its full extent. The thinness of the glass wool fabric in respect to its characteristics of strength for the purpose in hand, enables the volume of active material to be increased in respect to the available battery space.

From the foregoing description and at the risk of some repetition but for the sake of a fuller exposition of the invention the following may be said.

For the type of battery referred to among the requirements the following may be mentioned.

(1) The tube must act as a retainer for the active material, retaining and, as well as possible, preventing penetration of the particles of active material as they may become detached from the mass when it tends to soften with use.

(2) The tube must permit of expansion of the active material and core-rods or spines without rupture and at the same time it must exert sufficient resistance to preserve electrical contact between the active material and spines.

(3) In case the material of the tubes is subject to slow attack by the acid of the electrolyte the products of decomposition must be such as not to exert any deleterious effect on the performance of the cell.

Having regard to the above mentioned requisites it may be said of asbestos which in the form of a fabric is always associated with cotton or other organic fibers.

(a) It fulfills the first requirement.

(b) As to the second requirement it loses its tenacity or tensile strength entirely because it is attacked by the acid electrolyte. Hence it fails completely to fill the second requirement.

(c) Since asbestos of all grades is subject to attack by sulphuric acid with the result that where it is used in a storage battery the electrolyte is contaminated with iron in such quantity as to impair the function of the cell it fails to meet the third requirement.

In respect to slotted rubber tubes it may be said that such slotted rubber tubes as have been used for many years fulfill the first requirement in such large measure that they are extensively employed in the industry. However, the retention of the active material by slotted rubber tubes is subject to two principal limitations. In the first place the slots which afford access of the electrolyte to the interior of the tube are of necessity very large compared with the particle size of the active material; secondly, the rubber which composes the tubes is subject to very gradual but continued decomposition whereby the walls are slowly dissolved from the inside and at the same time the slots are gradually widened. Thus seepage of the active material though slight at the beginning increases with age and frequently constitutes the limiting factor of the life of the battery. Rubber tubes as now in use fulfill initially the second requirement in large measure but their walls are gradually thinned in use until they eventually fail on that account.

In connection with the third requirement it may be said that the decomposition of the rubber tubes which has been referred to results in the generation of gases which escape from the cell and hence have no harmful effect upon its function.

In connection with glass fabric tubes and referring to requirement (1) it may be said that owing to the fineness of the ultimate fibers and the closeness with which they may be fabricated, the pores of the glass tubes may be made of dimensions comparable to or even smaller than the particle size of the lead peroxide. Hence such fabricated glass tubes act as a most effective means for retaining the active material in place indefinitely.

Concerning the second requirement it may be said that in the fabrication of glass tubes the fibers are first twisted into threads which are combined into strands and the strands are then woven, braided or otherwise fabricated into tube form. As a result the individual fibers are not straight but are tortuous; and hence when pressure is exerted within the tube the fibers straighten out and afford the necessary expansion but without loss of resiliency or ability to exert sufficient pressure to retain electrical contact between the spines and the active material.

In respect to the third requirement inasmuch as the described glass tubes are not subject to chemical attack they completely fill the third requirement.

Those skilled in the battery art know that glass in inert in respect to battery chemical action and they also know the conditions to which the tubes or envelopes of the type of batteries herein discussed are subjected and the various strains and stresses occurring, but it can not be determined and ascertained from any well known characteristic of the action of glass wool fabric in respect to its behavior under such stresses, strains and other conditions as occur in the envelope or tube of a tubular electrode that glass wool fabric tubes would exactly meet all the requirements of those stresses, strains and conditions and in that way prolong the life and increase the capacity of such a battery. In other words it was not known nor is it shown that glass wool threads in fabric form and in the shape of tubes would by reason of their mobility and tortuous form meet the requirements in such a way as to increase the capacity and life of such a battery.

It will be obvious to those skilled in the art to which the invention relates that modications may be made in details of construction and arrangement without departing from the spirit of the invention which is not limited in respect to such matters or otherwise than as the prior art and the appended claims may require.

I claim:

1. A storage battery having plates comprising pencils of active material or material to become active mounted on metallic spines joined at their ends to top and bottom bars, and tubular retainers enclosing the pencils and consisting of glass wool fabric which by the mobility of its fibers and threads relative to each other and by the non-stretchability of the fibers and threads in a longitudinal direction and the resilience of the fibers and threads under flexure accommodates growth of the spines and softening of the pencils while keeping them in electrical contact and without rupture of the fabric, thereby increasing the life and efficiency of the battery.

2. A storage battery having electrodes consisting of pencils of active material mounted on spines connected to top and bottom bars and provided with tubular retainers made of glass wool fabric stretchable by movement of its fibers and threads to a limited degree relative to each other and sufficient to accommodate growth of the spines and softening of the active material, and said fabric thereafter being relatively unstretchable and adapted to oppose less violent growth of the spines and to retain the active material in electrical contact with them.

3. A storage battery having plates comprising pencils of active material or material to become active mounted on metallic spines joined at their ends to top and bottom bars, and tubular retainers enclosing the pencils and consisting of glass wool fabric of which substantially all of the threads completely encircle the pencils and which retainers by the relative mobility of the fibers and the threads accommodate growth of the spines and softening of the pencils while keeping them in electrical contact and without rupture of the fabric, thereby increasing the life and efficiency of the battery.

4. A tubular retainer for the active material of secondary or storage batteries comprising: a seamless, self-supporting tube of braided glass wool fabric provided with passages extending therethrough from the outer side to the inside so that the electrolyte is permitted to pass therethrough but the active material is prevented from falling away.

5. A tubular retainer for the active material of secondary or storage batteries comprising: a seamless, self-supporting tube of knitted glass wool fabric provided with passages extending therethrough from the outer side to the inside so that electrolyte is permitted to pass therethrough but the active material is prevented from falling away.

CLARENCE A. HALL.